(12) United States Patent
Murray

(10) Patent No.: US 10,246,100 B2
(45) Date of Patent: Apr. 2, 2019

(54) SYSTEM AND METHOD FOR VEHICLE PATH PREDICTION

(71) Applicant: VEONEER SWEDEN AB, Vargarda (SE)

(72) Inventor: Shane Murray, Wilmington, MA (US)

(73) Assignee: VEONEER SWEDEN AB, Vargarda (SE)

( * ) Notice: Subject to any disclaimer, the term of this patent is extended or adjusted under 35 U.S.C. 154(b) by 31 days.

(21) Appl. No.: 15/525,026

(22) PCT Filed: Nov. 6, 2015

(86) PCT No.: PCT/EP2015/075872
§ 371 (c)(1),
(2) Date: May 5, 2017

(87) PCT Pub. No.: WO2016/071478
PCT Pub. Date: May 12, 2016

(65) Prior Publication Data
US 2018/0281814 A1    Oct. 4, 2018

(51) Int. Cl.
*B60W 30/12*   (2006.01)
*B60W 50/00*   (2006.01)
*B60W 30/095*  (2012.01)

(52) U.S. Cl.
CPC .... *B60W 50/0097* (2013.01); *B60W 30/0953* (2013.01); *B60W 30/0956* (2013.01);
(Continued)

(58) Field of Classification Search
CPC ......... B60W 50/0097; B60W 30/0956; B60W 30/0953; B60W 2550/10; B60W 2720/24;
(Continued)

(56) References Cited

U.S. PATENT DOCUMENTS 9,914,453 B2 *  3/2018  Kraehling ......... B60W 30/0953
2001/0053955 A1  12/2001  Shirai et al.
(Continued)

FOREIGN PATENT DOCUMENTS

EP          1 354 767 A2   10/2003
WO    WO 2002/21156 A2    3/2002

OTHER PUBLICATIONS

Mc Gehee, et al. "Driver Reaction Time in Crash Avoidance Research: Validation of a Driving Simulator Study on a Test Track", retrieved from the internet May 31, 2017, 4 pages.
(Continued)

*Primary Examiner* — Michael J Zanelli
(74) *Attorney, Agent, or Firm* — Brinks Gilson & Lione

(57) ABSTRACT

A method of predicting a future path of a vehicle, comprising the steps of: sensing a speed, and direction, and yaw rate of the vehicle; sensing a steering angle of the vehicle; sensing a driving lane near the vehicle, or along which the vehicle is being driven; calculating a first path prediction, for a first period of time following the current time, the first path prediction comprising a trajectory predicted based on the sensed speed and the direction and the yaw rate; calculating a second path prediction, for a second period of time, at least some of which is later than the first period of time, which assumes that a steering action arising from changes in the steering angle will take effect on the vehicle; calculating a third path prediction, for a third period of time, at least some of which is later than the second period of time, which assumes that the driver of the vehicle will control the trajectory of the vehicle to attempt to follow at least substantially the driving lane; and formulating a combined predicted path for the first, second and third periods of time, wherein the first, second and third path predictions each contribute to the combined predicted path.

12 Claims, 10 Drawing Sheets

(52) U.S. Cl.
CPC ......... *B60W 30/12* (2013.01); *B60W 2520/06* (2013.01); *B60W 2520/10* (2013.01); *B60W 2520/14* (2013.01); *B60W 2540/18* (2013.01); *B60W 2550/10* (2013.01); *B60W 2550/14* (2013.01); *B60W 2710/30* (2013.01); *B60W 2720/10* (2013.01); *B60W 2720/106* (2013.01); *B60W 2720/24* (2013.01)

(58) Field of Classification Search
CPC ....... B60W 2720/106; B60W 2720/10; B60W 2520/06; B60W 2520/14; B60W 2520/10; B60W 2540/18; B60W 2710/30
See application file for complete search history.

(56) References Cited

U.S. PATENT DOCUMENTS

| | | |
|---|---|---|
| 2005/0182539 A1 | 8/2005 | Maass |
| 2006/0085131 A1 | 4/2006 | Yopp et al. |
| 2008/0091318 A1* | 4/2008 | Deng .................... B62D 6/003 701/41 |
| 2016/0288831 A1* | 10/2016 | Lee .......................... B62D 6/00 |

OTHER PUBLICATIONS

Triggs, et al., "Reaction Time of Drivers to Road Stimuli", Human Factors Report No. HFR-12, ISBN 0 86746 147 0, Human Factors Group, Department of Psychology, Monash University, Victoria 3800 Australia, Jun. 1982, retrieved from the internet May 31, 2017, 67 pages.

Search Report and Written Opinion dated Jan. 20, 2016, of PCT/EP2015/075872.

\* cited by examiner

SYSTEM AND METHOD FOR VEHICLE PATH PREDICTION

CROSS-REFERENCE TO RELATED APPLICATIONS

This application is a 35 U.S.C. § 371 National Phase Application of PCT/EP2015/075872, filed Nov. 6, 2015, which claims the benefit of priority to European Patent Application Serial No.: EP 14192091.8, filed Nov. 6, 2014, the contents of which are incorporated herein by reference in their entirety.

BACKGROUND

This invention relates to a system and method for predicting the path of a motor vehicle during driving.

Many modern vehicles include safety systems which are intended to be activated before the occurrence of a hazardous event such as a collision or the departure of the vehicle from a road. However, it is strongly preferred not to activate vehicle safety systems unnecessarily, as this may be annoying and distracting for the driver, and may even result in hazard and injury, for instance in the case of an incorrect firing of an airbag inside the vehicle cabin.

In order to activate preemptive safety systems of this type, it is important to be able to determine the future path of the vehicle accurately. Predicting the future path of the vehicle will allow the vehicle's processor to determine whether or not a hazardous situation is generally likely to occur.

US2006/0085131 discloses a path estimation system in which a processor generates potential future paths based on different criteria, and assigns confidence levels to these different paths. A final predicted path is calculated based on a weighted combination of some or all of these potential paths. It is an object of the present invention to provide an improved path prediction system and method of this type.

Accordingly, one aspect of the present invention provides a method of predicting a future path of a vehicle, comprising the steps of: sensing a speed, and direction, and yaw rate of the vehicle; sensing a steering angle of the vehicle; sensing a driving lane near the vehicle, or along which the vehicle is being driven; calculating a first path prediction, for a first period of time following the current time, the first path prediction comprising a trajectory predicted based on the sensed speed and the direction and the yaw rate; calculating a second path prediction, for a second period of time, at least some of which is later than the first period of time, which assumes that a steering action arising from changes in the steering angle will take effect on the vehicle; calculating a third path prediction, for a third period of time, at least some of which is later than the second period of time, which assumes that the driver of the vehicle will control the trajectory of the vehicle to attempt to follow at least substantially the driving lane; and formulating a combined predicted path for the first, second and third periods of time, wherein the first, second and third path predictions each contribute to the combined predicted path.

Advantageously, the first, second and third path predictions each contribute to the combined predicted path with respective first, second and third contribution weights that vary over the time of the combined predicted path.

Preferably, in formulating the combined path prediction, the first path prediction only is used for the first period of time, and/or wherein, in formulating the combined path prediction, the second path prediction only is used for the second period of time, and/or wherein, in formulating the combined path prediction, the third path prediction only is used for the third period of time.

Conveniently, the first path prediction comprises the vehicle
 a) continuing in the current sensed direction, or
 b) continuing to turn with respect to the sensed direction at the sensed yaw rate, or
 c) continuing to turn with respect to the sensed direction at a yaw rate which continues to change at the sensed rate of change of yaw rate, and
 a) continuing at the current sensed speed, or
 b) continuing to accelerate/decelerate with respect to the sensed speed at the sensed rate of acceleration/deceleration, or
 c) continuing to accelerate/decelerate with respect to the sensed speed at an acceleration/deceleration which continues to change at the sensed rate of change of acceleration/deceleration Advantageously, the second period of time is calculated to begin after a period corresponding to a steering lag of the vehicle, and/or wherein the third period of time is calculated to begin after the sum of a first period corresponding to a reaction time for the driver, and a second period corresponding to a steering lag of the vehicle.

Preferably, for at least one time within the first, second or third period of time, a path prediction is made based on a combination of two or more of the first, second and third path predictions.

Conveniently, in a first transition period, the combined path prediction is based on a combination of the first path prediction and the second path prediction, according to their respective contribution weights.

Advantageously, in a second transition period, the combined path prediction is based on a combination of the second path prediction and the third path prediction, according to their respective contribution weights.

Preferably, in a third transition period, the combined path prediction is based on a combination of the first, second and third path predictions, according to their respective contribution weights.

Conveniently, the contribution weights of the respective path predictions vary over time during the first, second or third transition period, as applicable.

Advantageously, the method further comprises the step of activating one or more vehicle safety systems if it is determined, based on the combined predicted path, that the vehicle will, or is likely to, encounter a hazardous situation.

Preferably, the method further comprises the step of detecting one or more objects in the vicinity of the vehicle, with which the vehicle might collide.

Conveniently, the method further comprises the step of identifying the normal direction of travel for the driving lane.

Another aspect of the present invention provides a computer program comprising computer program code adapted to carry out all of the steps of any of the above when the program is run on a computer.

A further aspect of the invention provides a computer program according to the above, embodied on a computer-readable medium.

BRIEF DESCRIPTION OF THE DRAWINGS

In order that the invention may be more readily understood, embodiments thereof will now be described, by way of example, with reference to the accompany drawings, in which.

DETAILED DESCRIPTION

Figure 1:
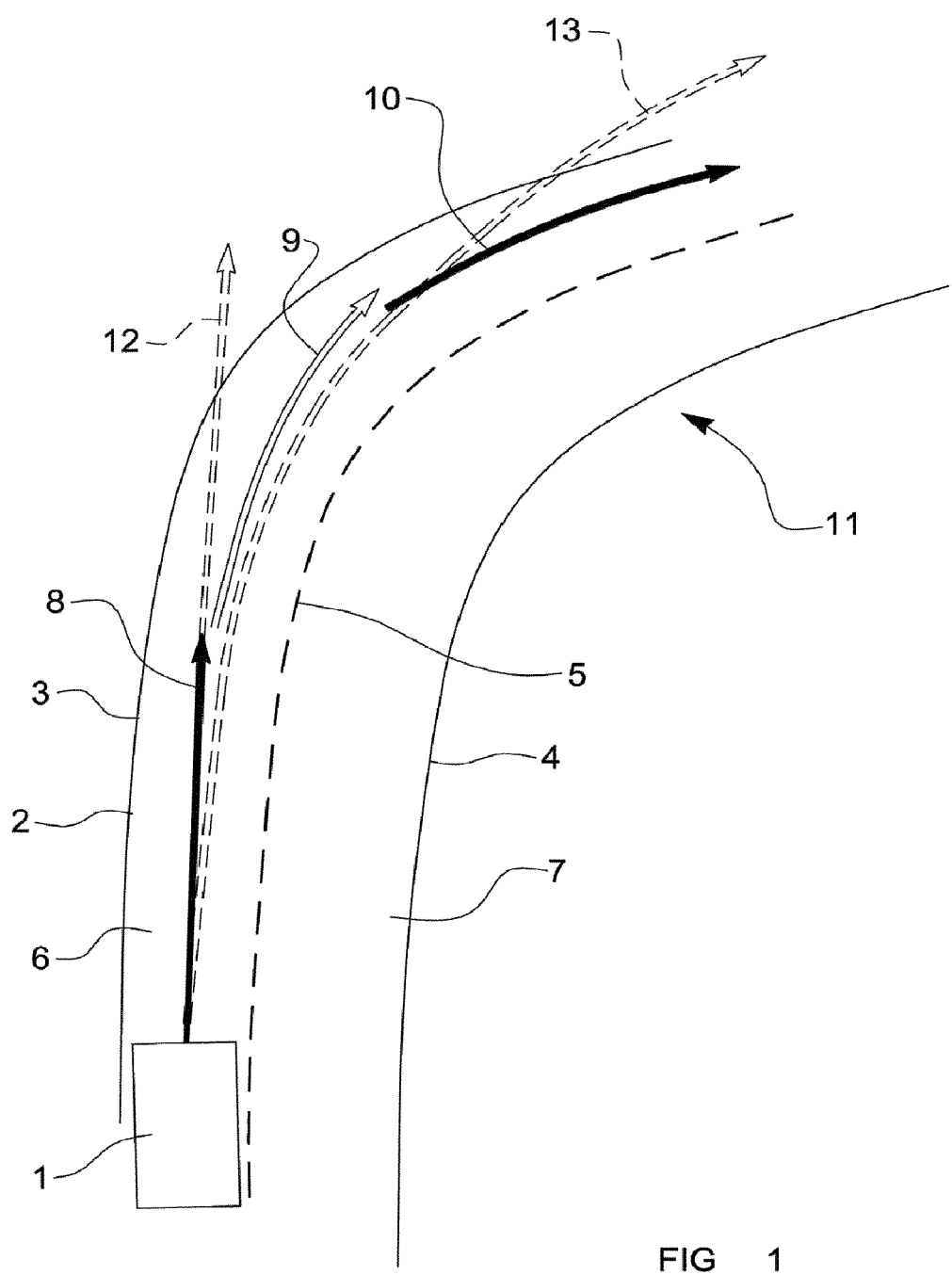
FIG. 1 shows a vehicle travelling on a road, along with a future path that is predicted according to an embodiment of the invention.

Referring firstly to FIG. 1 a vehicle 1 is shown, in the process of driving along a road 2.

The vehicle 1 has a processor (which may comprise a single processing unit, or a number of connected processing units), and is also equipped with a plurality of vehicle sensors.

The vehicle sensors include a speed sensor to determine the current speed of the vehicle 1. The sensor may comprise sensors which are adapted to sense the rate of rotation of one or more wheels of the vehicle 1. Alternatively, or in addition, the speed sensor may comprise a positioning system such as a GPS system, which measures the rate of travel of the vehicle 1 more directly.

The vehicle sensors also include a direction sensor to determine the current direction of travel of the vehicle. The direction sensor comprise a compass to determine the direction of the travel with respect to magnetic north/south, and/or may to comprise a positioning system such as a GPS system, which measures the rate of travel of the vehicle more directly.

The vehicle sensors further include a steering angle sensor, to detect a current angle of steering of the vehicle. This may include one or more sensors to determine the angle at which the steering wheel of the vehicle is set, and may alternatively, or in addition, include sensors to determine the angle at which wheels of the vehicle that are involved in steering (typically, the front wheels) are set with respect to the longitudinal axis of the vehicle.

The vehicle sensors also include a yaw rate sensor. As will be understood by those skilled in the art, the rate of yaw of the vehicle 1 is the rate at which the vehicle 1 is turning about an axis passing vertically through the centre of gravity of the vehicle 1. Yaw sensors may, as will be understood by the skilled reader, comprise inertial sensors which measure the acceleration arising from rotation of the vehicle 1 around the yaw axis.

In addition to the above, the vehicle 1 includes a lane detection arrangement, to detect a driving lane in the vicinity of the vehicle 1. As is known in the art, a lane detection arrangement may include one or more cameras which are positioned to capture images of the region around the vehicle 1. Cameras may point forwardly, rearwardly, to the side of the vehicle 1, or any combination of these. Images from the cameras are analyzed to determine features which indicate the boundaries of a driving lane. For instance, painted lines at the sides 3, 4 of the road 2 may be detected to determine the left and right boundaries of the driving surface. If painted lines are not present, or have been eroded or are obscured from view (for instance by snow or a covering of leaves) then other cues may be detected to determine the boundaries of the driving surface. For instance, the driving surface may be lower than the surrounding terrain, if the road has raised curbs and/or pavements on both sides. The road surface may alternatively be higher than the surrounding terrain. Alternately, or in addition, the road surface may have a difference color and/or reflectiveness than the surrounding terrain. The skilled person will appreciate how images from cameras positioned around the vehicle may be analysed to determine the boundaries of the driving surface.

In addition to this, one or more, one or more lines 5 that indicate the boundaries between driving lanes within the road surface may be detected. Once again, these lines 5 may comprise painted lines, but other structural features such as barriers or central reservations may be present.

In the example shown in FIG. 1, the road 2 has a dashed painted line 5 painted along its center, indicating the boundary between a driving lane 6 on the left hand side road, and an oncoming/overtaking lane 7 on the right-hand side of the road 2.

Instead of (or as well as) optical wavelength cameras, the lane detection arrangement may use other sensors such as infra-red sensors, or radar or lidar arrangements.

The vehicle 1 is further equipped with one or more safety devices, which may be reversible or irreversible. Examples of reversible safety systems include bracing arrangements in one or more seats, and electric seatbelt pre-tensioners. Examples of non-reversible safety devices include inflatable airbags and pyrotechnic seatbelt pre-tensioners.

The vehicle 1 may also be equipped with active braking and/or steering arrangements, which are operable to assume control of the braking and/or steering functions if it is determined that this control may avoid, or minimize the harm arising from, a hazardous situation.

The vehicle's processor includes a path prediction module which receives signals from some or all of vehicle sensors and use of these sensors to determine a likely future path of the vehicle 1.

In a preferred embodiment, the path prediction module determines first, second and third phases of the vehicle's future trajectory.

In doing so it is assumed that, during the first phase, the vehicle 1 will continue on a path at its current speed, or that the vehicle 1 will continue on a path at its current acceleration, and that the current yaw rate of the vehicle 1 will continue, or that the current rate of change of the yaw rate of the vehicle 1 will continue. If the vehicle 1 is driving in a straight line at constant speed, the linear acceleration and current yaw rate will be zero, and hence effectively during the first phase the vehicle 1 will continue at its current speed and direction. If the yaw rate is constant and not zero, then it is determined that during this first phase the vehicle 1 will continue to turn clockwise or anti clockwise relative to its current direction, at the current yaw rate. If the vehicle is accelerating/decelerating, and/or if the rate of change of the yaw rate is not zero, then in some embodiments this will be ignored and it will be assumed (for simplicity) that during the first phase the vehicle will continue to travel at the current speed, and with the current yaw rate. However, in further embodiments it will be assumed that the current rate of linear acceleration (or current rate of change of linear acceleration) and/or the current rate of change of yaw rate will continue during the first phase of the trajectory.

In FIG. 1 a line showing the predicted trajectory during the first phase is indicated by reference numeral 8.

The first phase may be regarded as unavoidable trajectory of the vehicle 1 in the short term, predicted by a measurement of the yaw rate, steering angle, derivatives thereof, a fusion of yaw rate and steering angle, or similar techniques known to those skilled in the art. If the driver of the vehicle 1 applies, or is already applying, a change to steering, a steering action, to the vehicle that would alter this trajectory, this steering action will not take effect immediately.

The skilled reader will understand that there is a lag between the application of steering action by the driver and the corresponding effect on the direction of the vehicle. However, in general the heading of the vehicle should be proportional to what the steering angle was at a time $T=T_{now}-T_{lag}$. Also, the relationship between the steering angle and the actual yaw rate of the vehicle varies with vehicle speed, steering ratio to Ackerman angle, tyre slip on road surface, and a range of dynamic factors (for instance, at higher speeds there is greater centripetal acceleration, and hence more tire slip once tyre friction is overcome).

The length of time for which the first phase is expected to persist is therefore set accordingly, and in preferred embodiments of the invention the length of time for which the first phase is predicted to occur is dependent on the lag between change of steering action applied by the driver and the effect of the change of steering on modifying the trajectory of the vehicle, which is dependent on the vehicle steering design of the vehicle manufacturer. However, this time is typically less than one second.

In preferred embodiments the first phase lasts for 2 seconds or less, in more preferred embodiments the first phase lasts for 1 second or less, and in further embodiments the first phase lasts for 0.5 seconds or less.

In addition, in preferred embodiments, the first phase last for at least 0.1 seconds, and in further embodiments lasts for at least 0.2 seconds.

The path prediction module also calculates a second phase of the vehicle's trajectory. In this second phase, the path of the vehicle 1 is predicted based on the current steering action that is applied by the driver. During this phase, the path is predicted based on steering angle. A prediction based on steering angle (i.e. the steering action applied by the driver), may be influenced by a range of steering factors, such as the rate of change of steering angle, the speed of the vehicle 1, steering ratio (i.e. the ratio between the angle through which the steering wheel turns and the angle through which the wheels of the vehicle 1 turn), tyre slip on the road surface, steering backlash, cornering design, and other dynamic factors. In embodiments of the invention, some or all of these factors may be taken into account in calculating the second phase of the trajectory, and the skilled person will understand that which factors are included will depend on the level of processing required, and the magnitude of the effect that each factor is likely to have on the predicted trajectory. In the simple case using the change in steering angle only (e.g. the steering angle now compared to what is or was at a time $T=T_{now}-T_{lag}$), the rate of change of the direction of the vehicle 1 predicted during this phase will be constant.

In some embodiments the trajectory of the vehicle 1 during the second phase is calculated based on the combination of the current steering action of the vehicle 1, and the current yaw rate of the vehicle. For instance, the current yaw rate of the vehicle 1 is set to be the initial yaw rate, and the manner in which the steering action of the vehicle 1 will affect this yaw rate is calculated.

In some embodiments, the current rate of change of the yaw rate is taken into account in predicting the trajectory of the vehicle 1 during the second phase. In particular, it may be assumed that a current rate of change of the yaw rate will continue between the initial time and the time over which steering action influences the trajectory during the second phase.

In the example shown in FIG. 1, the predicted trajectory of the vehicle 1 during the second phase is shown by an arrow indicated by reference numeral 9.

The time over which the second phase is predicted to persist begins after the first (unavoidable) phase of motion, i.e. after the steering action has time to influence the motion/trajectory of the vehicle. However, the second phase preferably persists for a time during which the driver will not, or substantially not, react to surrounding conditions, and for a further time during which any reaction of the driver will not have had time to influence the vehicle's trajectory, as discussed in more detail below.

The path prediction module also predicts a third phase of the trajectory of the vehicle 1. In this third phase, it is assumed that the driver will take action to try and follow the appropriate driving lane, where the appropriate driving lane is preferably the lane that is closest to where vehicle 1 is predicted to be after the end of the second phase of the trajectory, or which most closely correlates with the trajectory of the vehicle 1 estimated by the combination of the first and second prediction stages. During this third phase, therefore, the vehicle 1 is not predicted to continue on simply obeying the laws of physics, but the driver is expected to take positive action to exert control over the vehicle 1 so that the vehicle 1 follows, to the greatest possible extent, the appropriate driving lane, as shown in FIGS. 1 and 3-7.

In calculating the expected trajectory over the third phase, the processor will attempt to model the steering maneuvers that will be made by the driver to follow the driving lane. If the vehicle 1 is travelling along the driving lane in a controlled manner, this may involve simply turning the steering wheel so that the vehicle 1 continues to travel along the driving lane. If the vehicle 1 is travelling too fast to be able to turn in a controlled manner and follow the driving lane, the path prediction module will predict that the driver will take some action to follow the lane, even if this action is unsuccessful.

In a further example, if the vehicle 1 is anticipated to have left, or partially left, the driving lane following the second phase, the path prediction module will predict that the driver will attempt to maneuver the vehicle 1 back to the appropriate driving lane and, having reached the driving lane, will steer the vehicle 1 in a direction to follow the appropriate driving lane, as shown in will FIGS. 1 and 3-7.

In preferred embodiments of the invention, the third phase is determined to start when the driver has performed a steering action in response to the surroundings of the vehicle, and when this steering action has (in view of the steering lag) had time to have effect on the vehicle's trajectory.

The reaction time of a driver can be difficult to predict, and depends on several factors. In addition, if a predicted path is estimated from an initial time $T_0$, it may be the case that the driver was already (at the moment of time $T_0$) in the course of reacting to an event or stimulus that occurred shortly before time $T_0$. In preferred embodiments of the invention, an assumed reaction time is used to determine the start of the third phase.

For instance, a typical reaction time for steering has been found (in *Driver Reaction Time in Crash Avoidance Research: Validation of a Driving Simulator Study on a Test Track*, by McGehee, Mazzae and Baldwin) to be around 1.67 s. If this is added to an estimated steering lag time, the resulting total time may serve as an estimate for the start of the third phase. If a steering lag of 0.5 s is assumed, then the total time is around 2.17 s. In a separate study (Reaction Time of Drivers to Road Stimuli, by Triggs and Harris), deviation of a vehicle was found to begin between 1 and 2 s after an unexpected event (and so this time includes both reaction time and steering lag time), although the authors found that at least 3 s should be allowed for drivers to perform steering avoidance responses when changes in the roadway environment occur.

In preferred embodiments, the third phase is predicted to begin around 1-4, or more preferably 1-3, seconds after the time of calculation $T_0$. In more preferred embodiments the third phase is predicted to begin around 1.5-2.5 seconds after the time of calculation $T_0$. In some examples the third phase is predicted to begin at around 2 or around 2.17 seconds after the time of calculation $T_0$.

The third phase does not begin until after the start of the second phase. In embodiments discussed above where the first phase ends after a relatively long period of time (e.g. 2 seconds), this will correspond to circumstances where the vehicle has a relatively long steering lag, and in these circumstances the second phase will also end after a relatively long time, e.g. towards the upper end of the ranges given above.

In the third phase, it is expected that the driver will attempt to align with a path in or near the centre of the appropriate driving lane, where the alignment is performed at a rate proportional to the steering factors of the vehicle 1 as previously described above, such as the speed of the vehicle 1. The alignment action that the driver is expected to take will have a maximum, since the maximum safe turning rate of the vehicles is limited and will depend on the vehicle's speed.

Figure 2:
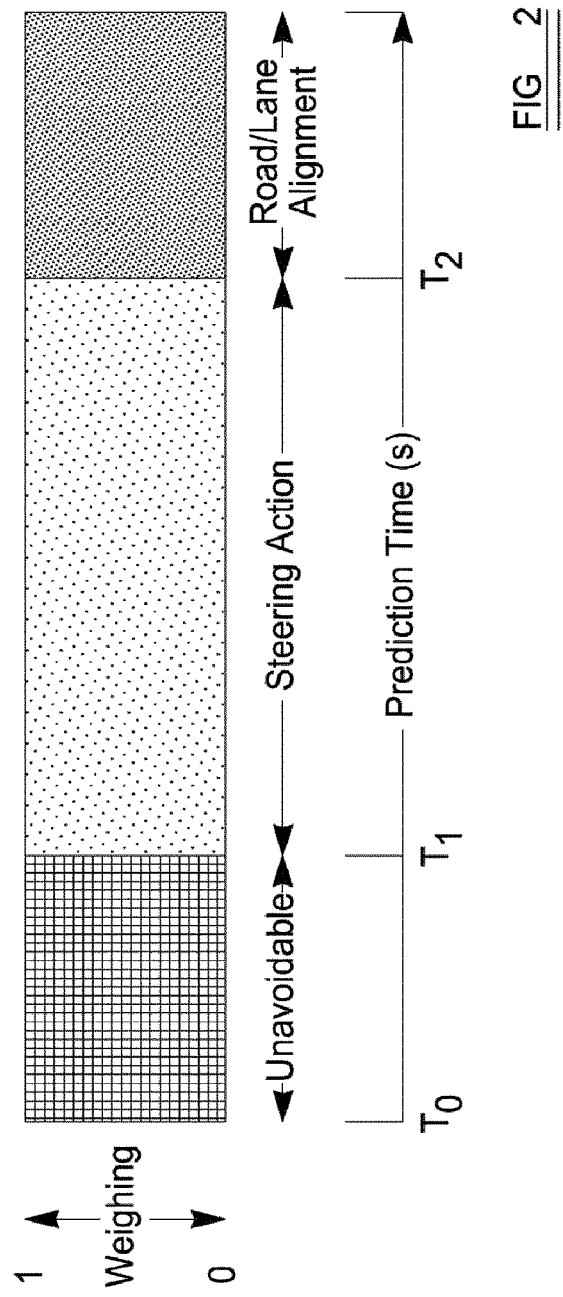
FIG. 2 shows a scheme for weighting components of a predicted path, according to an embodiment of the invention.

FIG. 2 is a schematic view showing the way in which the three predicted phases are used to calculate a composite, overall predicted path for the vehicle 1.

Beginning from the immediate time $T_0$, the vehicle 1 is expected to follow the first phase (i.e. unavoidable trajectory) until a first time $T_1$. After this first time $T_1$, the vehicle 1 is expected to follow the second phase trajectory (i.e. following current steering action) until a second time $T_2$.

Following this second time $T_2$, the vehicle 1 is expected to follow the third predicted trajectory, in which the driver attempts to follow the driving lane.

The weighting of each phase is shown on the left of the diagram in FIG. 2. In this embodiment during each time period the first, second or third trajectory is given full weighting (i.e. a weighting of 1, or of 100%). Therefore during the time from the immediate time $T_0$ to the first time $T_1$, the first phase trajectory is given 100% weighting. During the period between the first time $T_1$ and the second time $T_2$, the second phase of the prediction is given 100% weighting. Finally, after the second time $T_2$, the third phase prediction is given 100% weighting.

Returning to FIG. 1, at the time shown in FIG. 1 the vehicle is travelling along a road 2 which is, in the vicinity of the vehicle 1, generally straight, although a sharp right-hand bend 11 is ahead of the vehicle. The vehicle is travelling generally straight along the driving lane 6 of the road 2, although the driver has noted that a right-hand bend is approaching and has begun to apply steering to rotate the vehicle 1 in a clockwise direction.

It can be seen that, during the first predicted phase 8 of the vehicle's trajectory, the vehicle 1 continues to travel in a generally straight line along the driving lane 6. Although the driver has begun to apply steering to the vehicle, it is determined that the steering will not take effect during the first phase 8 of the trajectory.

In the second phase 9 of this trajectory, the effects of the driver's current steering action are calculated, and it is found that this will result in the vehicle 1 rotating clockwise about the yaw axis and thus turning right.

In the third phase 10 of the trajectory, it is anticipated that the driver will take action to follow the driving lane 6, and hence will turn the steering wheel more sharply to the right, causing the vehicle 1 to follow the driving lane 6.

By contrast, an arrow 12 shows the predicted trajectory of the vehicle 1 if it is assumed that the unavoidable motion of the vehicle continues for a longer period of time. It can be seen that this trajectory 12 leaves the road 2, as it predicts that the vehicle 1 does not turn sharply enough to remain in the driving lane during the right-hand turn 11.

There is no reason to determine that the vehicle 1 will not safely negotiate the turn 11, and this predicted path 12 is therefore not a good or reliable indication of the vehicle's likely future trajectory.

A further line 13 shows the predicted trajectory if the current steering action of vehicle 1 is determined to continue for a longer period of time. It can be seen that, as the vehicle continues through the right-hand turn 11, the steering action is not sufficient to cause the vehicle 1 to stay in the driving lane 6, and once again the vehicle 1 exits the road 2 to the left-hand side.

However, assuming that the driver is fully awake and in control of the vehicle 1, there is no reason to suspect that the driver will not take action to steer the vehicle 1 safely around the turn 11, and this trajectory 13 is also not a good or reliable indicator of the likely future trajectory of the vehicle 1.

If the vehicle's processor predicted that vehicle would follow along either of these other two trajectories 12, 13, the processor might well determine that the vehicle 1 is likely to be involved in a hazardous incident, such as a "run off the road" event.

The processor may therefore activate one or more safety mechanisms such as a pre-tensioner, or engaged active braking and/or steering of the vehicle. In this situation, however, it can be seen that these measures would be unnecessary, and may cause annoyance or alarm to the driver.

Figure 3:
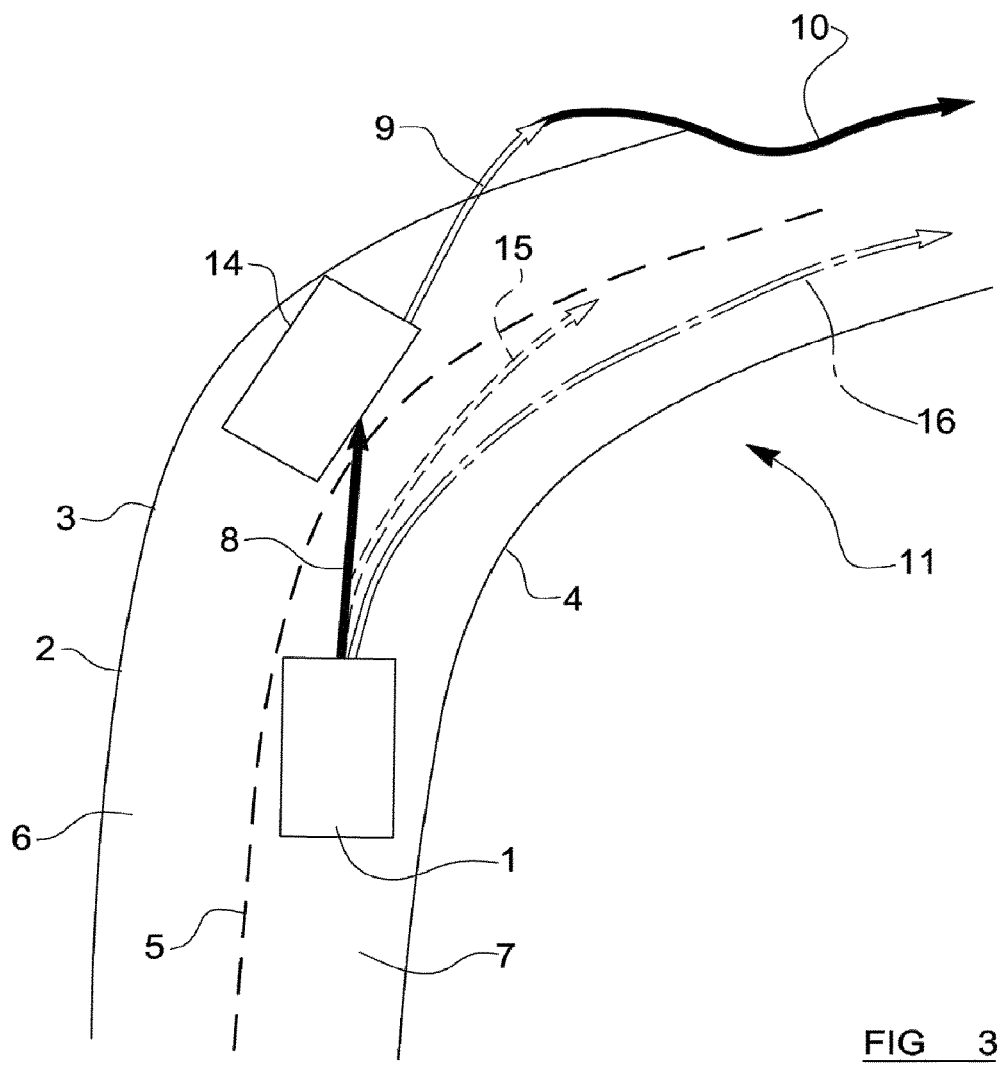
FIGS. 3 to 7 show further examples of a vehicle travelling on a road, along with future paths that are predicted according to embodiments of the invention.

Turning to FIG. 3, a further scenario is shown, once again on a road 2 which involves a right-hand bend 11.

In this scenario, the vehicle 1 has moved into the overtaking lane 7, in order to overtake a further vehicle 14 which is ahead of the vehicle 1 in the regular driving lane, 6 and travelling more slowly than the vehicle 1. The vehicle 1 is traveling at relatively high speed towards the bend 11, and approaching the further vehicle 14.

In accordance with embodiments of the invention, the future path of the vehicle 1 is predicted to involve an unavoidable first phase 8, a second phase 9 in which the current steering action of the driver takes effect, and third phase 10 in which the driver attempts to follow the driving lane.

At the time shown in FIG. 3, the driver is turning relatively gently to the right. As shown in FIG. 3, by using this approach the path prediction module will predict that the first and second phases of motion 8, 9 will result in the vehicle travelling forwardly into the regular driving lane 6, across the driving lane 6 and exiting the left-hand side of the road 2, before the driver takes corrective action and maneuvers the vehicle back to the road 2, and then steers along the driving lane 6.

Importantly, the path prediction module predicts that, during the first and second phases of motion 8, 9 (i.e. before the driver takes corrective action), the predicted path of the vehicle 1 will intersect with the position of the further vehicle 14. It should be understood that, in determining whether or not the predicted future path of the vehicle 1 will intersect with the position of another vehicle, the current speed, acceleration, and direction of the other vehicle may be taken into account to determine the likely future position of the other vehicle.

In the example shown in FIG. 3, the processor will determine that corrective action and/or the activation of safety devices is appropriate, either to try and avoid the collision with the further vehicle 14, or to minimize the risk of harm to the vehicle occupants as the collision occurs.

By contrast, a further line 15 is shown on FIG. 3, showing the trajectory that would be predicted if only the current steering action was taken into account.

Another line 16 is shown, indicating the trajectory that would be predicted if the processor only took into account the driver attempting to follow the driving line i.e. without taking into account the fact that, before this occurs, there will be phases of motion dictated by the vehicle's current speed, trajectory, yaw rate and steering action.

It should be understood that the lane of the road that is considered to be the driving lane may vary depending upon the manner in which the vehicle is driven. In particular, in the case of a two-lane road such as shown in FIGS. 1 and 3, the default driving lane may be assumed to be the "forward" lane, i.e. the left-hand lane if the vehicle is being driven in a country having a rule that vehicles drive on the left.

If it is determined that the vehicle is engaged in an overtaking manoeuvre, the processor may assume that, for the time being, the driving lane (i.e, the lane that the driver is expected to try to follow) is the oncoming/overtaking lane 7, and adjust the future trajectory accordingly.

Systems and methods for determining whether a vehicle 1 is engaged in an overtaking maneuver are known in the art, and will not be discussed in detail here.

Figure 4:
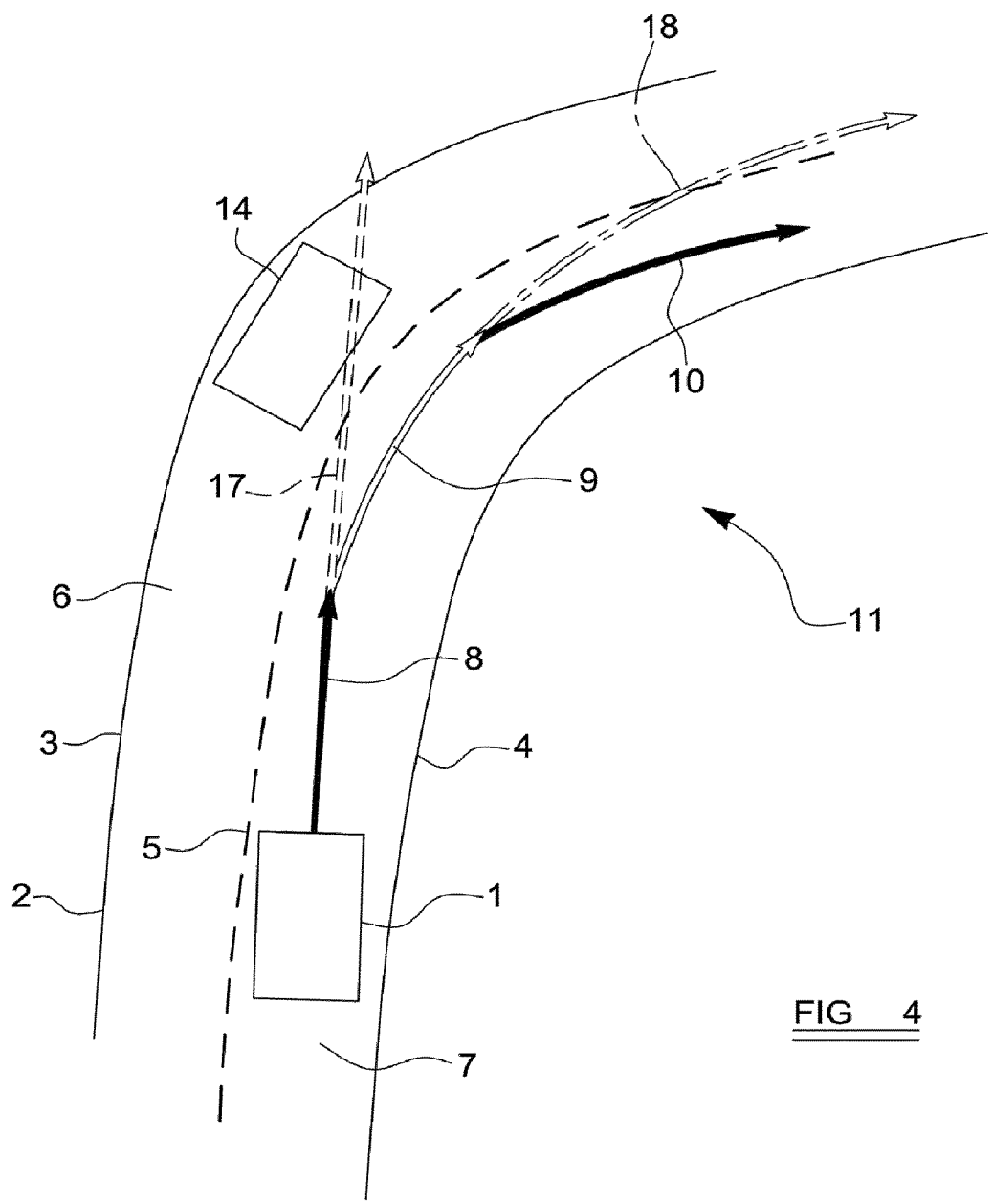

Referring now to FIG. 4, a further scenario is shown, again in which the said vehicle 1 has moved into the oncoming/overtaking lane 7 in order to overtake a further vehicle 14 which is travelling more slowly in the regular driving lane 6.

Again, the vehicle 1 is approaching a right-hand bend 11 in the road 2. In this scenario, the vehicle 1 is further away from the further vehicle 14, and is not travelling as quickly, as in the previous scenario (i.e. the one shown in FIG. 3). According to an embodiment of the invention, the path prediction module of the vehicle 1 calculates that the vehicle will follow a path comprising a first phase 8 (unavoidable motion, as discussed above), a second phase 9 (based on current steering action) and third phase 10 (in which the driver will attempt to follow the driving lane).

In this embodiment, the first and second phases 8, 9 of the predicted trajectory remain within the oncoming/overtaking lane 7, and in the third phase 10 it is assumed that the driver will attempt to maintain the vehicle in this lane 7. Note that, for the purposes of the third phase 10, the lane in which the driver is expected to try and follow is the oncoming/overtaking lane 7, and not the regular driving lane 6, since lane 7 better correlates with the path calculated by the first and second phases 8, 9. The path prediction module will therefore determine that the vehicle 1 will continue safely with the overtaking manoeuvre.

Also shown in FIG. 4 is a further line 17, showing the predicted path of the vehicle 1 if the unavoidable motion of the vehicle is assumed to continue for a greater length of time. It can be seen that this path 17 intersects with the position of the further vehicle 14, and on this basis it would be predicted that the vehicle 1 will collide with the further vehicle 14. However, it will be understood that this would be an unreliable prediction.

Further, a line 18 is shown which is based on a prediction that the second phase of motion, based on current steering action, will continue for a greater length of time. It can be seen that, on this basis, the vehicle 1 will not turn sharply enough to remain in the oncoming/overtaking lane 7 and will drift into the regular driving lane 6. However, there is no reason to expect that the driver will not correct the course of the vehicle 1 to follow the oncoming/overtaking lane 7, and this would therefore also be unreliable prediction.

Figure 5:
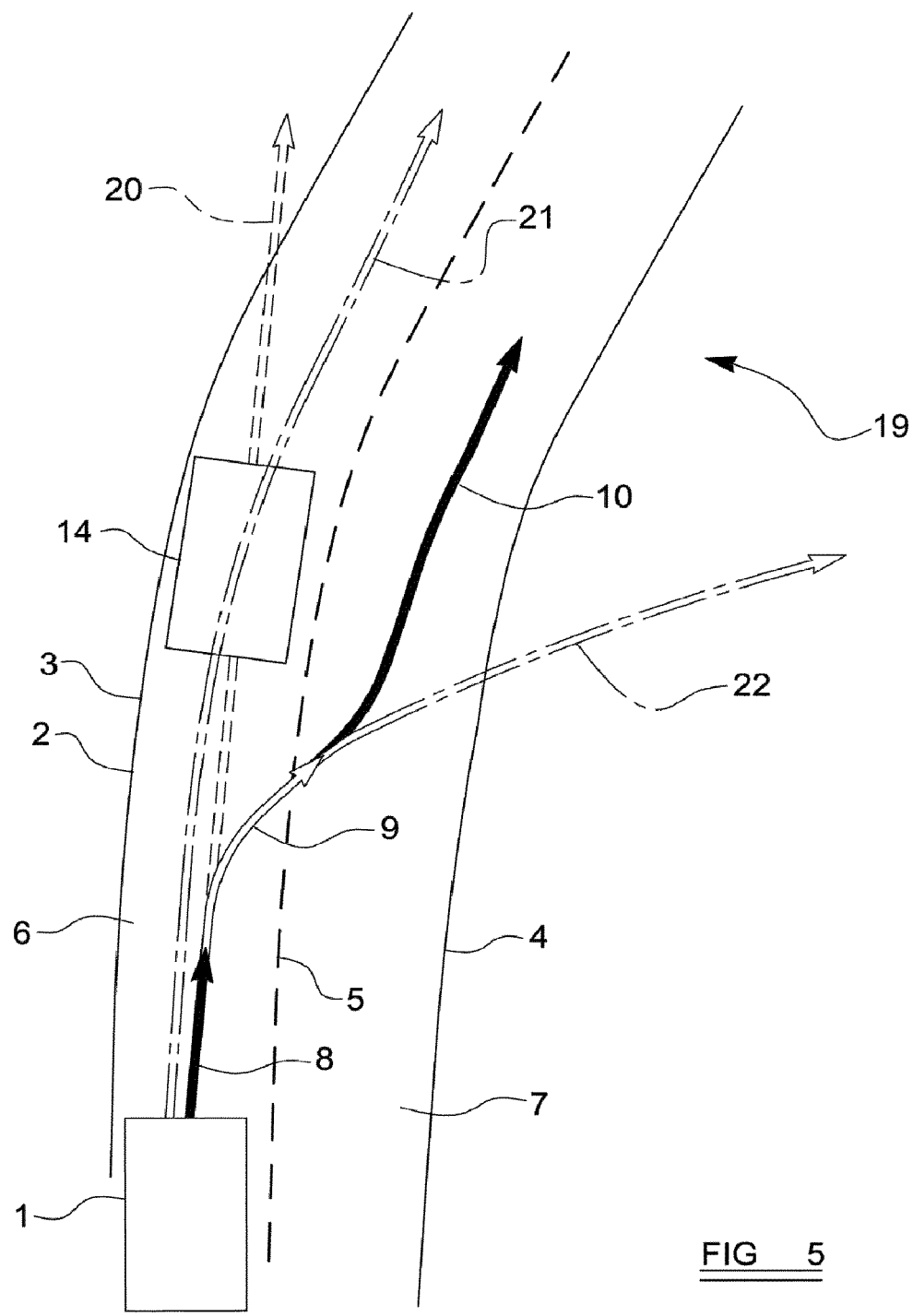

Turning to FIG. 5, a further scenario is shown, in which the vehicle 1 is driving along the regular driving lane 6, and slower-moving further vehicle 14 is ahead in the regular driving lane 6. The driver of the vehicle 1 has started to turn the steering wheel to the right. The road describes a relatively gentle right-hand bend 19 ahead of the vehicle 1.

According to an embodiment of the invention, the path prediction module 20 the vehicle 1 predicts a future path for the vehicle 1, including a first phase 8 in which the vehicle travels generally ahead along the regular driving lane 6. In a second phase 9 of the predicted trajectory, the vehicle 1 begins to turn to the right, as the action of the current steering applied by the driver of the vehicle 1 takes effect. The second phase of the trajectory carries the vehicle into the oncoming/overtaking lane 7.

In a third phase 10 of the predicted trajectory it is anticipated that the driver will attempt to follow the oncoming/overtaking lane 7, as it is determined that the vehicle 1 is likely to be engaged in an overtaking manoeuvre.

It can be seen that the composite path formed by three phases 8,9,10 of the predicted path shows a likely and plausible scenario for the future motion of the vehicle 1.

By contrast, a further arrow 20 is shown which predicts the future motion of the vehicle 1 based only on the current trajectory, and it can be seen that this path 20 intersects with the position of the further vehicle 14, thus representing a prediction that the vehicle 1 will collide with the rear of the further vehicle 14.

Another line 21 shows the predicted path if it is only assumed that the driver will maintain the vehicle 1 in the regular driving lane 6. Once again, this path intersects with the position of the further vehicle 14, and effectively predicts that the vehicle 1 will collide with the further vehicle 14.

Another arrow 22 is shown based on the prediction that the current steering action of the vehicle 1 will continue to take effect for a longer period of time. It can be seen that this path 22 predicts that the vehicle 1 will turn to the right and will not subsequently correct this course, leading to a prediction that that the vehicle will leave the road 2 on the right-hand side. There is no reason to assume that the driver will continue to maneuver the vehicle 1 in this way, however, and it can also be seen that this path 22 is not a reliable prediction of the future path of the vehicle 1.

Referring to FIG. 6, once again the vehicle 1 is shown driving along the driving lane 6 of a road 2, and ahead of the vehicle 1 the road 2 describes a relatively sharp right-hand turn 11. A further vehicle 14 is driving in the regular driving lane 6 ahead of the vehicle 1. A branching road 23 extends away from the road 2 to the left, ahead of the vehicle 1. The driver has, at the moment shown in FIG. 6, just begun to apply left-hand steering to the vehicle 1.

In accordance with an embodiment of the invention, the vehicle 1 is predicted to follow a path comprising a first phase 8, in which the unavoidable current motion of the vehicle 1 continues. In a second phase 9 of the vehicle's predicted trajectory, the left-hand steering applied by the driver takes effect, and the vehicle steers to the left, joining the branching road 23.

In third phase 10 of the predicted path the driver then makes subsequent corrections to the course of the vehicle 1 to keep the vehicle within the regular driving lane 6 of the branching road 23.

Figure 6:
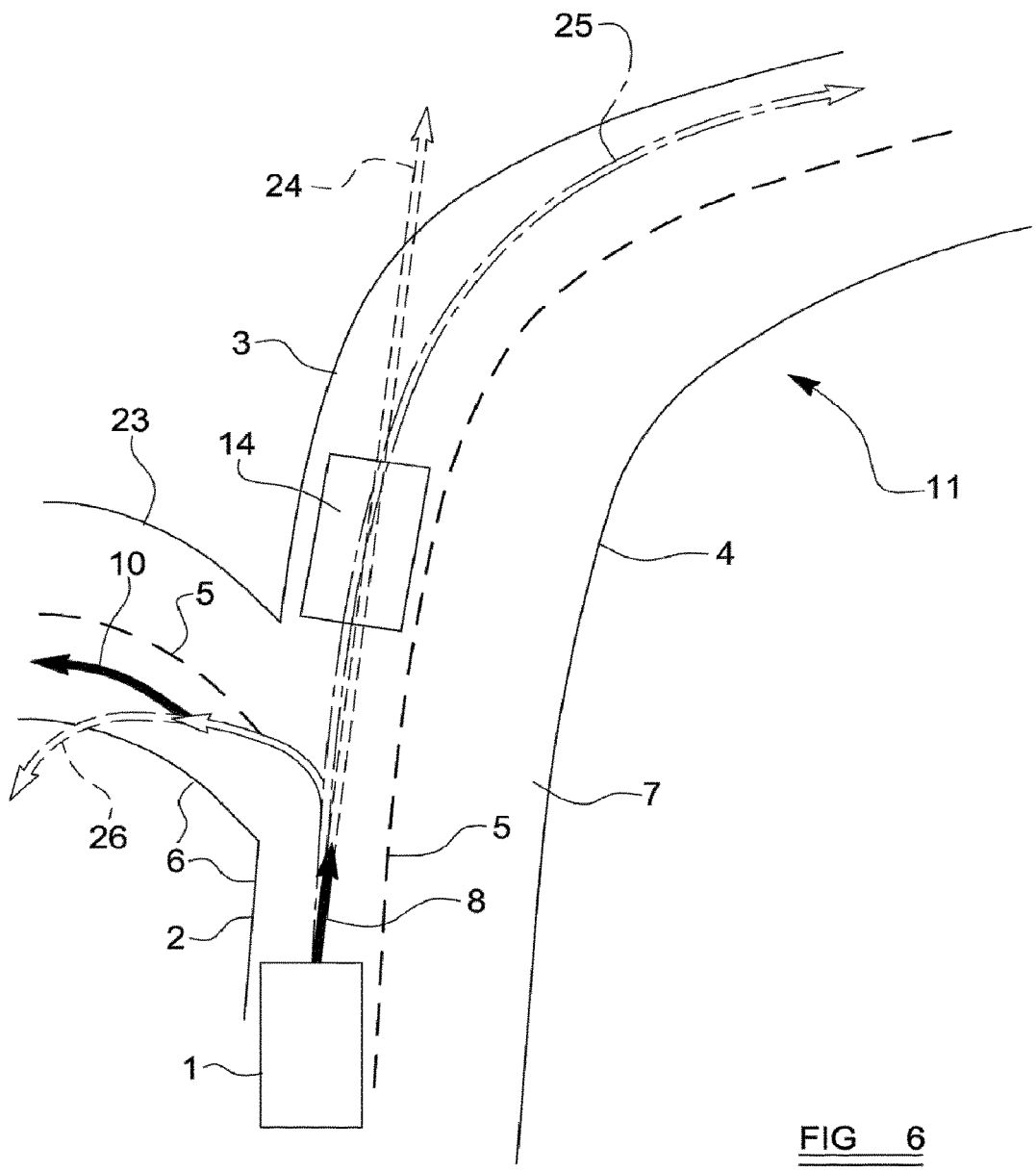

It can be seen that this is a likely and plausible approximation of the future path of the vehicle 1 given the circumstances at the moment shown in FIG. 6.

A further line 24 is shown on FIG. 6, indicating the predicted trajectory of the vehicle 1 based only on the detected current speed and rate of yaw. It will be seen that this path 24 intersects with the position of the further vehicle 14, thus representing a prediction that the vehicle 1 will collide with the further vehicle 14.

Another line 25 is shown on FIG. 6 indicating the predicted path if it is determined that the driver of the vehicle 1 will attempted to maintain the vehicle in the regular driving lane 6 of the road 1. Once again, this path 25 intersects with the position of the further vehicle 14.

Another line 26 is shown indicating the predicted path of the vehicle if the current steering action of the vehicle 1 is predicted to persist for a greater length of time. It can be seen that, following this path, the vehicle 1 does turn into the branching road 23, but subsequently oversteers and exits the left-hand side of the branching road 23. These alternative paths 24, 25, 26 do not, therefore, represent reliable predictions of the vehicle's future position.

Figure 7:
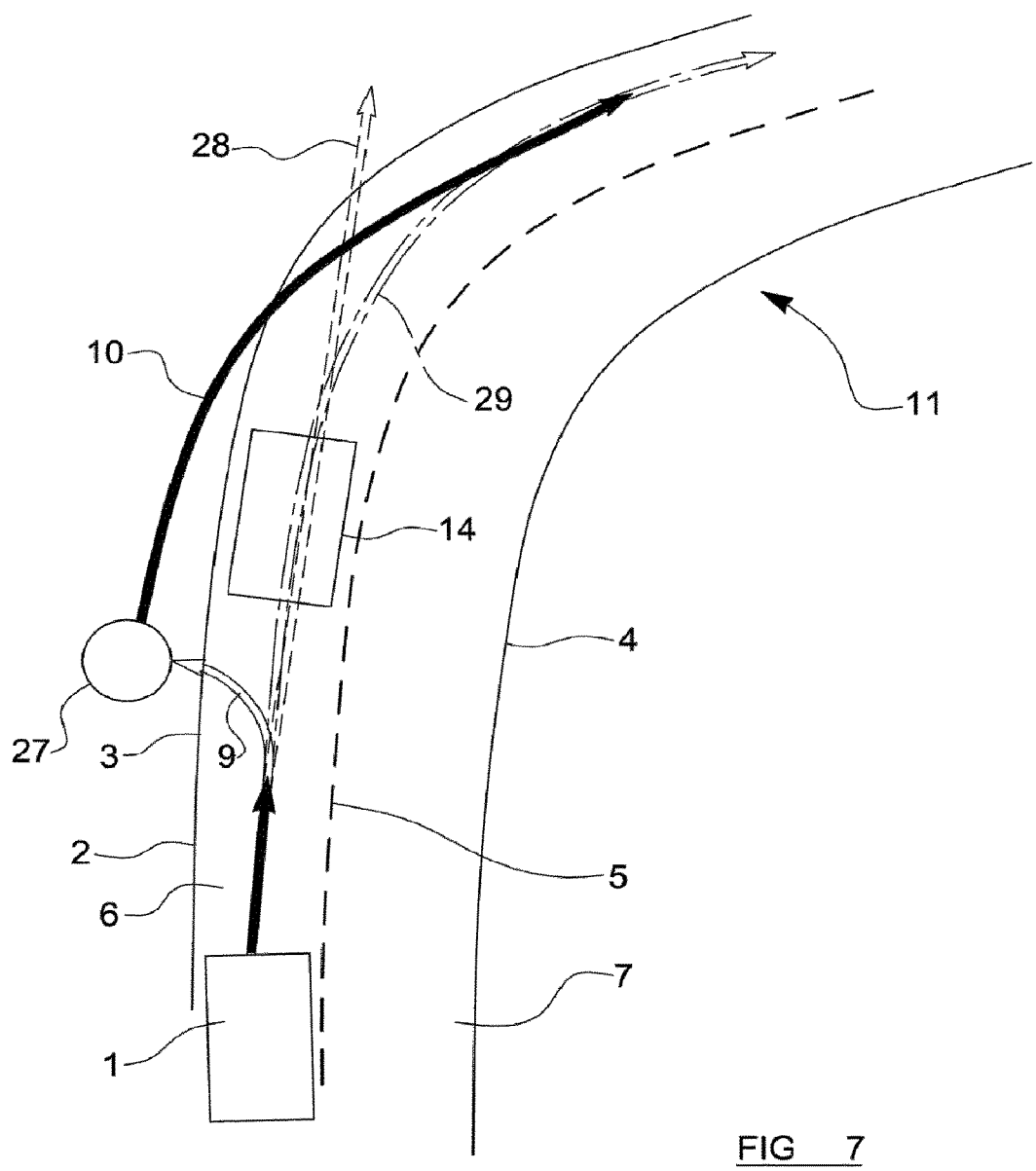

Referring to FIG. 7, a further scenario is shown. Again the vehicle 1 is driving along a road 2, with a relatively sharp right-hand bend 11 ahead of the vehicle 1.

A further regular vehicle 14 is driving in the regular driving lane 6 of the road 2 ahead of the vehicle 1. The vehicle 1 is being driven at a relatively high speed, and is travelling more quickly than the further vehicle 14.

A roadside object 27, such as a pole, post or tree is beside the road 2, on the left-hand side. At the moment shown in FIG. 7, the driver has begun to apply relatively sharp steering to the vehicle 1, to turn the vehicle 1 left (i.e. anti-clockwise).

In one possible set of circumstances giving rise to this scenario, the driver 1 may have only just realised that the vehicle 1 is travelling significantly more quickly than the further vehicle 14, and has instinctively steered the vehicle to take evasion action.

As with the previous embodiments, the path prediction module predicts that the vehicle 1 will follow a future path comprising a first phase 8, during which the current motion of the vehicle 1 continues. The prediction path also includes a second phase 9, in which the current steering action of the driver takes effect.

It can be seen that the second phase 9 of the trajectory intersects with the roadside object 27, thus representing a prediction that the vehicle 1 will collide with the roadside object 27.

The path prediction module also predicts a third phase 10, in which the driver of the vehicle attempts to return the vehicle 1 to the regular driving lane 6 and continue along the lane 6. It will be understood by the skilled reader, however, that the practical effect of the prediction is that the vehicle 1 will collide with the roadside object 27 during or after the second phase 9, and vehicle 1 may therefore stop abruptly, and not continue to the third phase 10 of the prediction.

Based on this prediction, the processor of the vehicle 1 may engage active braking and/or steering measures, in an attempt to avoid collision with the roadside object 27. Alternatively, or in addition, one or more safety features such as a seatbelt pre-tensioner and an airbag may be activated in order to minimise the likely harm arising from the predicted impact with the roadside object 27.

Also included in FIG. 7 is a further line 28, which is based only on the current motion of the vehicle continuing. It will be seen that this line 28 does predict that the vehicle 1 will collide with the further vehicle 14, but fails to predict that the vehicle 1 will turn left and collide with the roadside object 27. This difference may be important, since colliding with a stationary, narrow feature such as a tree or pole may be significantly more dangerous than colliding with the rear of a vehicle which is travelling in the same direction (and hence at much lower relative speed), and which presents an obstacle that is much wider and includes crumple zones. This further line 28 would therefore be liable to underestimate the severity of the situation.

Another line 29 on FIG. 7 indicates the predicted path if it is assumed that the driver will simply follow the regular driver in lane 6 with the road 2. Once again, this path predicts that the vehicle 1 will collide with a further vehicle 14, but does not predict that the vehicle 1 will collide with the roadside object 27.

From the examples given above it can be seen that, compared to other potential approaches for calculating the likely future path of a vehicle, embodiments of the invention provide realistic and reliable approximate future vehicle trajectories.

It is envisaged that, in preferred embodiments, the likely future path of the vehicle is predicted on a regular basis, for instance during every cycle of the vehicle's processing unit, which may be around 50 ms, but may alternatively be, for example, every second or every tenth of a second. If, at any time, a predicted future trajectory indicates that one or more safety systems of the vehicle 1 must be activated, activation of the appropriate safety system(s) takes place based on the calculated future trajectory.

In some embodiments, if the vehicle is predicted to encounter a hazardous situation during the second or third phases of the trajectory, only reversible restraint systems (such as an electric seatbelt pre-tensioner) may be activated. This is because the level of certainty associated with the second and third predicted phases of the trajectory is less than that associated with the first phase. By contrast, if the predicted path indicates that the vehicle is likely to encounter a hazardous situation during the first phase of the trajectory, irreversible restraint systems such as airbags or pyrotechnics seatbelt pre-tensioners may be activated.

Similarly, if the predicted trajectory indicates that the vehicle will encounter a hazardous situation during the second or third phases of the trajectory, one or more warnings may be provided to the driver (for instance, with visual, audible or haptic warnings, as is known in the art), but no active braking or steering will be activated. However, if the vehicle is predicted to encounter a hazardous situation during the first phase of the trajectory, active braking and/or steering may be triggered.

As discussed above, and with reference to FIG. 2, in some embodiments of the invention the predicted trajectory involves the calculated unavoidable motion for a first period of time, with this unavoidable motion being given 100% weighting, and the second phase of the trajectory (immediately following and contiguous with the first phase) involves the calculated motion based on current steering action, with this part of the trajectory again being given 100% weight.

Figure 8:
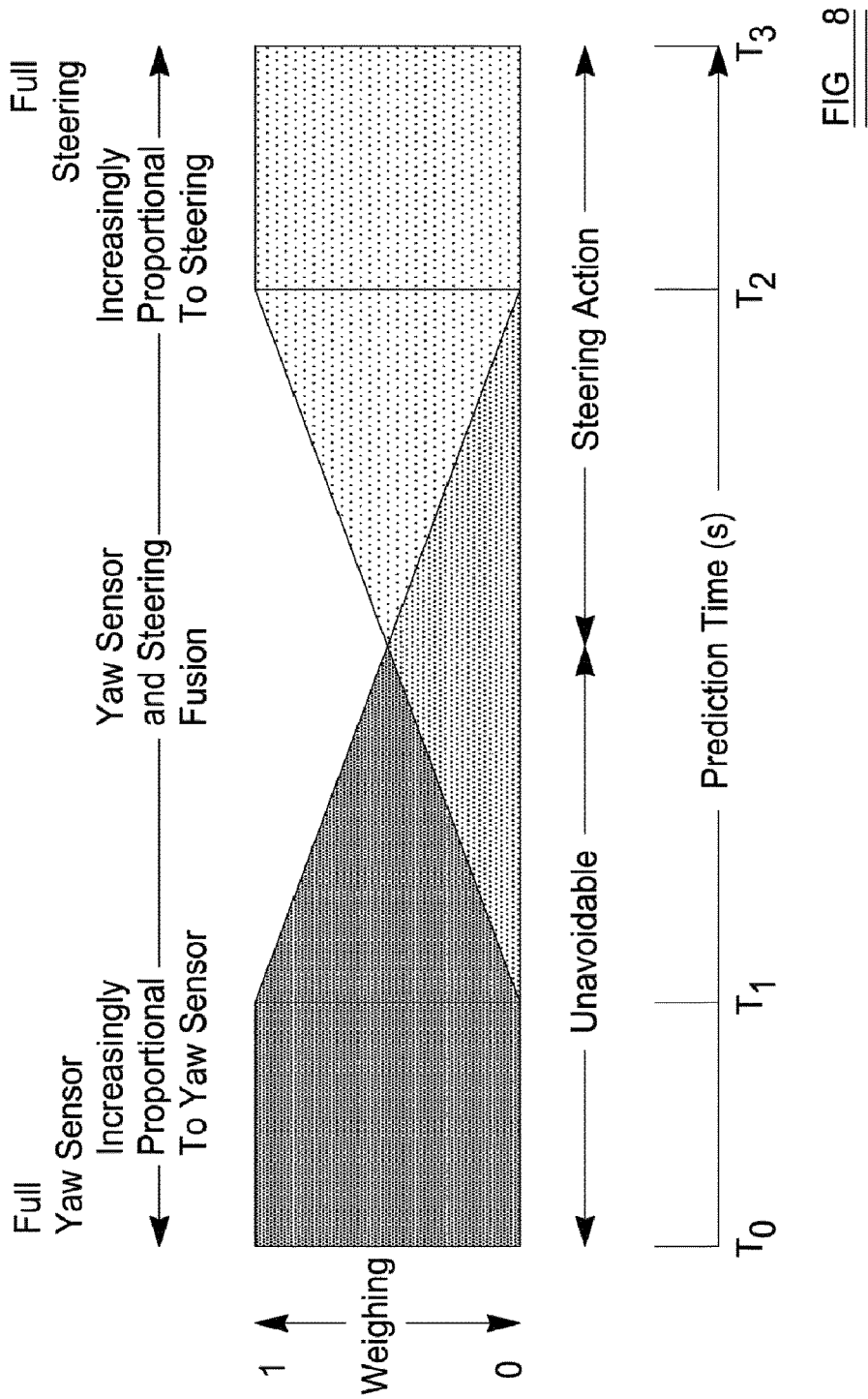
FIGS. 8 to 10 show further schemes for weighting components of a predicted path, according to embodiments of the invention.

Referring to FIG. 8, an alternative embodiment is shown. A time line represents the weighting that is given to the various predicted phases of the trajectory over time. On the left hand-side of the diagram shown in FIG. 8, the initial time is the time at which a prediction is made, indicated by $T_0$.

The trajectory over a first period of time (from the initial time $T_0$ to a first time $T_1$) is determined to be the calculated unavoidable motion of the vehicle, as discussed above, and this is given 100% weighting.

Between this first time $T_1$ and a second time $T_2$, the predicted path is a superposition or combination of the predicted unavoidable motion and the calculated motion based on the current steering action of the driver. During the time between the first time $T_1$ and second time $T_2$, the weighting of the first trajectory based on avoidable motion is gradually decreased, and be weighting of the trajectory based on current steering action is correspondingly increased. In the embodiment shown in FIG. 8, between the first time and second time the weighting accorded to the unavoidable motion decreases linearly from 100% to 0%, and the weighting accorded to the calculated motion based on current steering action increases linearly from 0% to 100%. It will therefore be seen that, for the time between the first time $T_1$ and the second time $T_2$, the predicted trajectory is a weighted superposition of the calculated trajectory based on unavoidable motion and the calculated trajectory based on current steering action, with the weighting of these two contributing trajectory phases changing over time.

In alternative embodiments the weighting of the two components may change in a different manner, rather than simply linearly, and the skilled person will appreciate how this may be implemented. It is understood that these weightings may be tuned or adjusted to match the movement characteristics of particular vehicle manufacturer models, and that is it also understandable to one skilled in the art that these curves do necessarily not need to be linear.

From the second time $T_2$ to a third time $T_3$, the calculated trajectory is determined to be the calculated motion based on current steering action, with this trajectory being given a weight of 100%.

It can therefore be seen that, in the example shown in FIG. 8, as the predicted trajectory changes from the first phase to the second phase, the calculated trajectories may include a region of overlap where the two calculated trajectories are superposed on one another, rather than the arrangement shown in FIG. 2 where the predicted trajectory switches abruptly from the first phase to the second phase.

Figure 9:
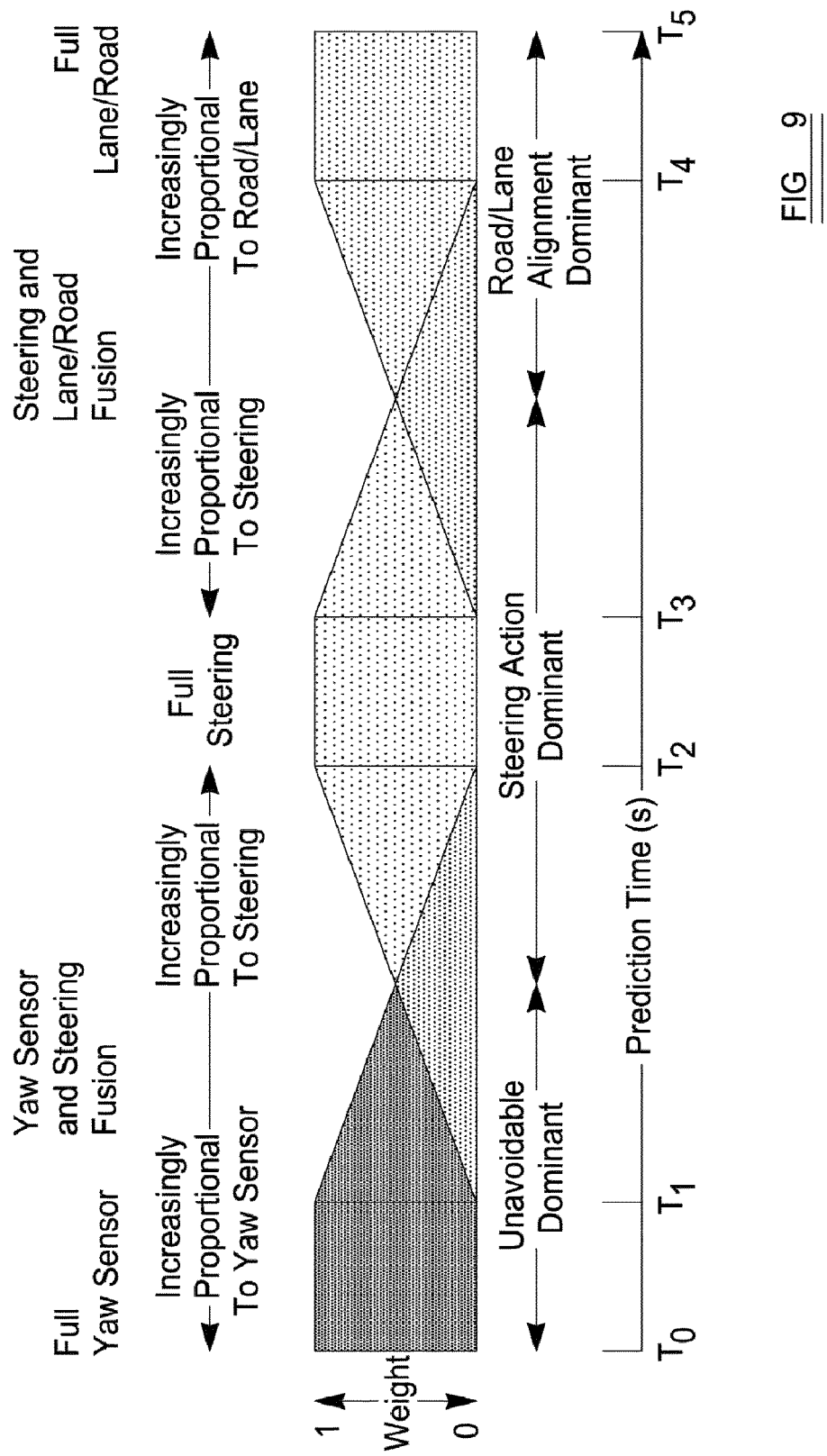

Referring to FIG. 9, a timeline is shown extending from the first phase to the third phase, including a transition zone between the first phase and the second, and also a similar transition zone between the second phase and the third.

In particular, for a first period of time from the initial time $T_0$ to a first time $T_1$, the calculated trajectory comprises only the calculated motion based on unavoidable motion of the vehicle. A weighted transition zone between the first phase and the second phase then occurs, between the first time $T_1$ and a second time $T_2$. This is followed by a period of time between the second time $T_2$ and a third time $T_3$, in which the calculated trajectory is solely based on the second phase, i.e. the calculated trajectory based on current steering action. Following this, between the third time $T_3$ and a fourth time $T_4$, a transition phase occurs, which is a superposition of the predicted trajectory based on current steering action and the predicted trajectory based on the assumption that the driver will attempt to follow the driving lane.

Following this transition zone, from the fourth time $T_4$ to at least a fifth time $T_5$, the trajectory is wholly based on the third phase of the trajectory, based on driver taking action to follow the driving lane.

Figure 10:
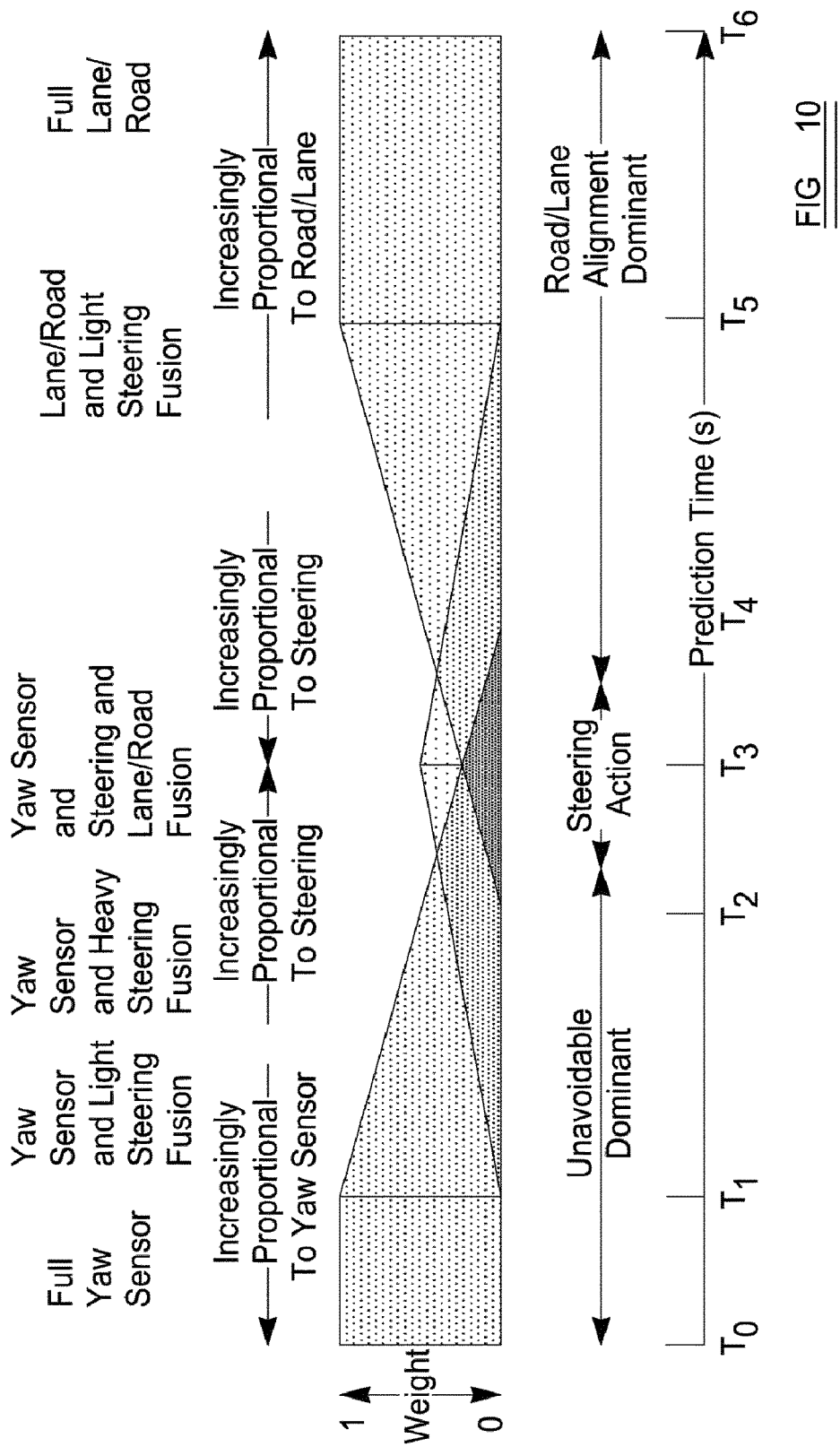

Referring finally to FIG. 10, a further scheme is shown for the weighting of the various predicted trajectories to compose the overall predicted path for the vehicle.

Once again, in a first period of time from the initial time $T_0$ to a first time $T_1$, the predicted trajectory is based wholly on the first predicted phase.

Between the first time $T_1$ and a second time $T_2$, the contribution of the first phase decreases linearly, and the contribution of the second phase increases linearly.

At the second time $T_2$, before the contribution of the first phase has reached zero, a contribution from the third phase is introduced, which increases linearly.

At a third time $T_3$, the first, second and third phases all contribute to the overall path. At this stage, the second phase has the greatest weighting (in this embodiment, a weighting of about 50%), with the first and third trajectories each contributing a lesser weighting, in this embodiment 25% each.

The contribution of the second phase reaches a maximum at the third time $T_3$. After the third time $T_3$, the contribution of the second phase begins to decrease linearly. At a fourth time $T_4$, the contribution of the first phase reaches zero, and the predicted trajectory is a weighted combination of the second phase (the contribution of which is decreasing linearly) and the third phase (the contribution of which is increasing linearly).

At a fifth time $T_5$, the contribution of the second phase reaches zero, and the predicted trajectory is wholly based on the third phase. This persists at least until a sixth time $T_6$.

The skilled person will realize that weighted trajectories such as those shown in FIGS. 8, 9 and 10 will produce a smoother overall predicted path for the vehicle. A predicted path which is calculated in this way is also likely to be more realistic; in a real world scenario it is not likely that the vehicle will carry on an avoidable motion for a first period, and that this will then immediately cease, with the motion of the vehicle being replaced by motion based on current steering action. While the arrangement shown in FIG. 2 therefore represents a robust and simple approach (and one which may be preferred in some circumstances, for instance because it minimizes the required processing power/time), embodiments such as shown in FIGS. 8, 9 and 10 are likely to represent a predicted future path for the vehicle which is closer to reality.

The skilled person will understand that embodiments of the present invention provide a useful and accurate approximation of the likely future path of a vehicle, which will allow the triggering of the appropriate safety systems to protect vehicle occupants (and potentially others, such as pedestrians), but which minimise the risk of accidental or inappropriate activation of vehicle safety systems.

The invention claimed is:

1. A method of predicting a future path of a vehicle, comprising the steps of:
sensing a speed, a direction, and a yaw rate of the vehicle;
sensing a steering angle of the vehicle; sensing a driving lane near the vehicle, or along which the vehicle is being driven;
calculating a first path prediction, for a first period of time following a current time, the first path prediction comprising a trajectory predicted based on the sensed speed, the sensed direction and the sensed yaw rate;

calculating a second path prediction, for a second period of time, at least some of which is later than the first period of time, which assumes that a steering action arising from changes in the steering angle will take effect on the vehicle;

calculating a third path prediction, for a third period of time, at least some of which is later than the second period of time, which assumes that the driver of the vehicle will control the trajectory of the vehicle to attempt to follow at least substantially the driving lane;

formulating a combined predicted path for the first, the second and the third periods of time, wherein the first, the second and the third path predictions each contribute to the combined predicted path; and activating one or more vehicle safety systems if it is determined, based on the combined predicted path that the vehicle will, or is likely to, encounter a hazardous situation.

2. The method according to claim 1, further comprising wherein the first, the second and the third path predictions each contribute to the combined predicted path with respectively, a first, a second and a third contribution weights that vary over the time periods of the combined predicted path.

3. The method according to claim 2, further comprising wherein, in formulating the combined path prediction, the first path prediction only is used for the first period of time, or wherein, in formulating the combined path prediction, the second path prediction only is used for the second period of time, or wherein, in formulating the combined path prediction, the third path prediction only is used for the third period of time.

4. The method according to claim 2, further comprising wherein, for at least one time within the first, the second or the third period of time, a path prediction is made based on a combination of two or more of the first, the second and the third path predictions.

5. The method according to claim 4, further comprising wherein, in a first transition period, the combined path prediction is based on a combination of the first path prediction and the second path prediction, according to their respective contribution weights.

6. The method according to claim 4, further comprising wherein, in a second transition period, the combined path prediction is based on a combination of the second path prediction and the third path prediction, according to their respective contribution weights.

7. The method according to claim 4, further comprising wherein, in a third transition period, the combined path prediction is based on a combination of the first, second and third path predictions, according to their respective contribution weights.

8. The method according to claim 4, further comprising, wherein the contribution weights of the respective path predictions vary over time during a first, second or third transition period.

9. The method according to claim 1, wherein the step of calculating the first path prediction includes the following steps:
a) continuing in the current sensed direction, or
b) continuing to turn with respect to the sensed direction at the sensed yaw rate, or
c) continuing to turn with respect to the sensed direction at a yaw rate which continues to change at the sensed rate of change of yaw rate, or
d) continuing at the current sensed speed, or
e) continuing to accelerate or decelerate with respect to the sensed speed at the sensed rate of acceleration or deceleration, or
f) continuing to accelerate or decelerate the vehicle with respect to the sensed speed at an acceleration or deceleration which continues to change at the sensed rate of change of acceleration or deceleration.

10. The method according to claim 1, further comprising wherein the second period of time is calculated to begin after a lag period corresponding to a steering lag of the vehicle, or wherein the third period of time is calculated to begin after the sum of a first period corresponding to a reaction time for the driver, and a second period corresponding to a steering lag of the vehicle.

11. The method according to claim 1, further comprising the step of detecting one or more objects in the vicinity of the vehicle, with which the vehicle might collide.

12. The method according to claim 1, further comprising the step of identifying the normal direction of travel for the driving lane.

* * * * *

UNITED STATES PATENT AND TRADEMARK OFFICE
CERTIFICATE OF CORRECTION

PATENT NO. : 10,246,100 B2
APPLICATION NO. : 15/525026
DATED : April 2, 2019
INVENTOR(S) : Shane Murray Page 1 of 1

It is certified that error appears in the above-identified patent and that said Letters Patent is hereby corrected as shown below:

On the Title Page

In the left column, insert a new item as follows:
--(30) Foreign Application Priority Data
November 6, 2014 (EP) Europe 14192091.8--.

Signed and Sealed this
Thirteenth Day of August, 2019

Andrei Iancu
*Director of the United States Patent and Trademark Office*